(12) United States Patent
Barley et al.

(10) Patent No.: US 9,101,128 B2
(45) Date of Patent: Aug. 11, 2015

(54) ELECTRICAL DECOY APPARATUS

(71) Applicants: Christopher B. Barley, Grand Prairie, TX (US); James Brandon Roach, Grand Prairie, TX (US)

(72) Inventors: Christopher B. Barley, Grand Prairie, TX (US); James Brandon Roach, Grand Prairie, TX (US)

( * ) Notice: Subject to any disclaimer, the term of this patent is extended or adjusted under 35 U.S.C. 154(b) by 107 days.

(21) Appl. No.: 13/686,536

(22) Filed: Nov. 27, 2012

(65) Prior Publication Data

US 2014/0144062 A1    May 29, 2014

(51) Int. Cl.
*A01M 31/06* (2006.01)

(52) U.S. Cl.
CPC ..................... *A01M 31/06* (2013.01)

(58) Field of Classification Search
CPC ........ A01M 31/06; A01M 29/06; A63H 3/46; A63H 3/20; A63H 13/00; G06F 19/08; G06F 19/02; G06F 11/23
USPC ............ 43/2, 3, 26.1; 446/330, 335, 376, 377
IPC ............................................. A01M 31/06, 29/00
See application file for complete search history.

(56) References Cited

U.S. PATENT DOCUMENTS

| | | | |
|---|---|---|---|
| 2,439,710 A * | 4/1948 | Banigan | 43/3 |
| 2,575,252 A * | 11/1951 | Berger | 40/417 |
| 2,799,960 A * | 7/1957 | Riley | 43/3 |
| 2,849,823 A * | 9/1958 | Miller | 43/3 |
| 2,953,869 A * | 9/1960 | Collischan | 446/191 |
| 3,916,553 A * | 11/1975 | Lynch et al. | 43/3 |
| 5,036,614 A | 8/1991 | Jackson | |
| 5,884,427 A | 3/1999 | Lenz | |
| 6,360,474 B1 * | 3/2002 | Wurlitzer | 43/3 |
| 6,591,539 B2 * | 7/2003 | Cosciani | 43/2 |
| 6,901,693 B1 | 6/2005 | Crowe | |
| 7,627,977 B2 | 12/2009 | Denny | |
| 7,958,666 B2 | 6/2011 | Rogers | |
| 8,188,691 B1 | 5/2012 | Twohig | |
| 2005/0160654 A1 * | 7/2005 | Cosciani | 43/2 |
| 2007/0180755 A1 * | 8/2007 | Neeley et al. | 43/3 |
| 2009/0260273 A1 | 10/2009 | Rogers | |

FOREIGN PATENT DOCUMENTS

EP    1179296 A2 *   2/2002   ............ A01M 31/06

OTHER PUBLICATIONS

Machine translation of EP 1179296 to Golly published Feb. 2002.*

* cited by examiner

*Primary Examiner* — Kathleen Alker
(74) *Attorney, Agent, or Firm* — Geoffrey A. Mantooth; Brian K. Yost

(57) ABSTRACT

An electric decoy apparatus has a base, a motor unit mounted to the base, a support arm extending from the motor unit and a decoy cover on the support arm. The support arm follows a cam that is rotated by a motor in the motor unit. The support arm moves from a first position, to a second position and back to the first position and then to an intermediate third position before returning to the first position. The motor also rotates an eccentric weight which causes the motor unit to move relative to the base.

8 Claims, 5 Drawing Sheets

ELECTRICAL DECOY APPARATUS

FIELD OF THE INVENTION

The present invention relates to electrically operated decoys.

BACKGROUND OF THE INVENTION

The use of decoys is well known in hunting. For example, a duck hunter will lay out duck decoys on the water in order to draw a flock of ducks.

When hunting predators, like coyotes, decoys that resemble prey are used. For example, the decoy can resemble a rabbit, a bird, etc. Decoys that move are more lifelike and more successful in attracting predators of the desired animals.

SUMMARY OF THE INVENTION

An electric decoy apparatus comprises a housing and a motor located inside of the housing. The motor has a motor shaft. A support arm extends from the housing. The support arm is coupled to a support arm member. The support arm member is pivotally coupled to the housing by a first shaft. A decoy cover is located on the support arm. A cam is coupled to the housing and is rotated by the motor about a second shaft. The first and second shafts are separated from each other by a distance. The support arm member contacts the cam so as to pivot relative to the housing as the cam rotates.

In accordance with one aspect, the cam has a cam groove and the support arm has a cam rod located in the cam groove. The cam rod moves in the cam groove when the cam rotates.

In accordance with another aspect, the motor rotates about an axis that is perpendicular to the first shaft.

In accordance with another aspect, the cam groove is oval shaped. In accordance with still another aspect, the second shaft is eccentrically located within the oval shaped groove.

In accordance with still another aspect, the housing is pivotally mounted to a base. A weight is eccentrically located relative to the motor shaft. The weight is rotated by the motor shaft so as to cause the housing to move with respect to the base.

In accordance with another aspect, the housing rocks and rotates with respect to the base.

In accordance with still another aspect, the cam has a cam groove and the support arm has a cam rod located in the cam groove. The cam rod moves in the cam groove when the cam rotates. The cam groove is oval shaped. The second shaft is eccentrically located within the oval shaped groove. The housing is pivotally mounted to a base. A weight is eccentrically located relative to the motor shaft. The weight is rotated by the motor shaft so as to cause the housing to move with respect to the base.

A method of operating an electric decoy comprises providing a support arm with a decoy cover thereon. A motor shaft is rotated. The motor shaft rotates a cam about an axis. A support arm follows the cam and is moved from a first position to a second position and back to the first position and then to a third position and back to the first position, with the third position located between the first and second positions and the support arm reversing direction at each of the first, second and third positions.

In accordance with another aspect, the support arm, the motor shaft and the cam are mounted to a housing. The housing is mounted to a base. An eccentric weight is rotated with the motor shaft so as to cause the housing to move with respect to the base.

DESCRIPTION OF THE PREFERRED EMBODIMENT

Figure 1:
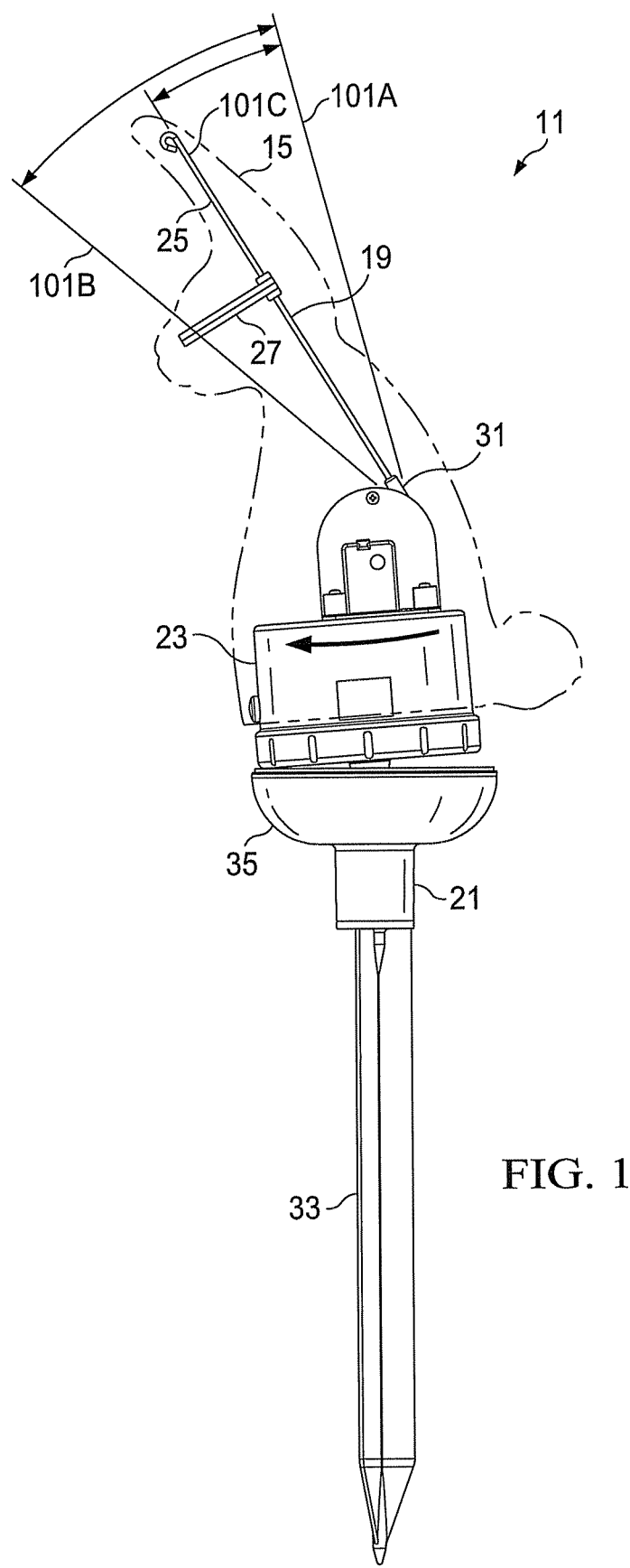
FIG. 1 is a side view of the decoy apparatus.

Referring to FIG. 1, the decoy apparatus 11 moves a decoy cover 15 (shown in dashed lines) in an enticing manner. The decoy cover 15 dips and rises in what appears to be an erratic or irregular pattern, and consequently appears lifelike. In addition, the decoy turns, or rotates, thus enhancing the movement and attractiveness to animals.

The decoy apparatus 11 includes a support 19, a decoy cover 15, a base unit 21 and a motor unit 23.

The support 19 has a support arm 25 that extends up front the motor unit 23. The support arm 25 has a lower end that is coupled to a support arm actuator or member, 31, which will be described in further detail below. The upper end of the support arm is free. A support ring 27 is located on the support arm, between the two ends of the support arm.

The decoy cover 15 resembles an animal such as a rabbit, or resembles part of an animal, such as an animal's tail. In the preferred embodiment, the decoy cover is made of material such as artificial fur. Much of the decoy cover is flexible and resembles a tube with a closed top end and a bottom open end that fits onto the motor unit 23 and the support 19. The decoy cover is moved by the support and the motor unit.

Figure 2A:
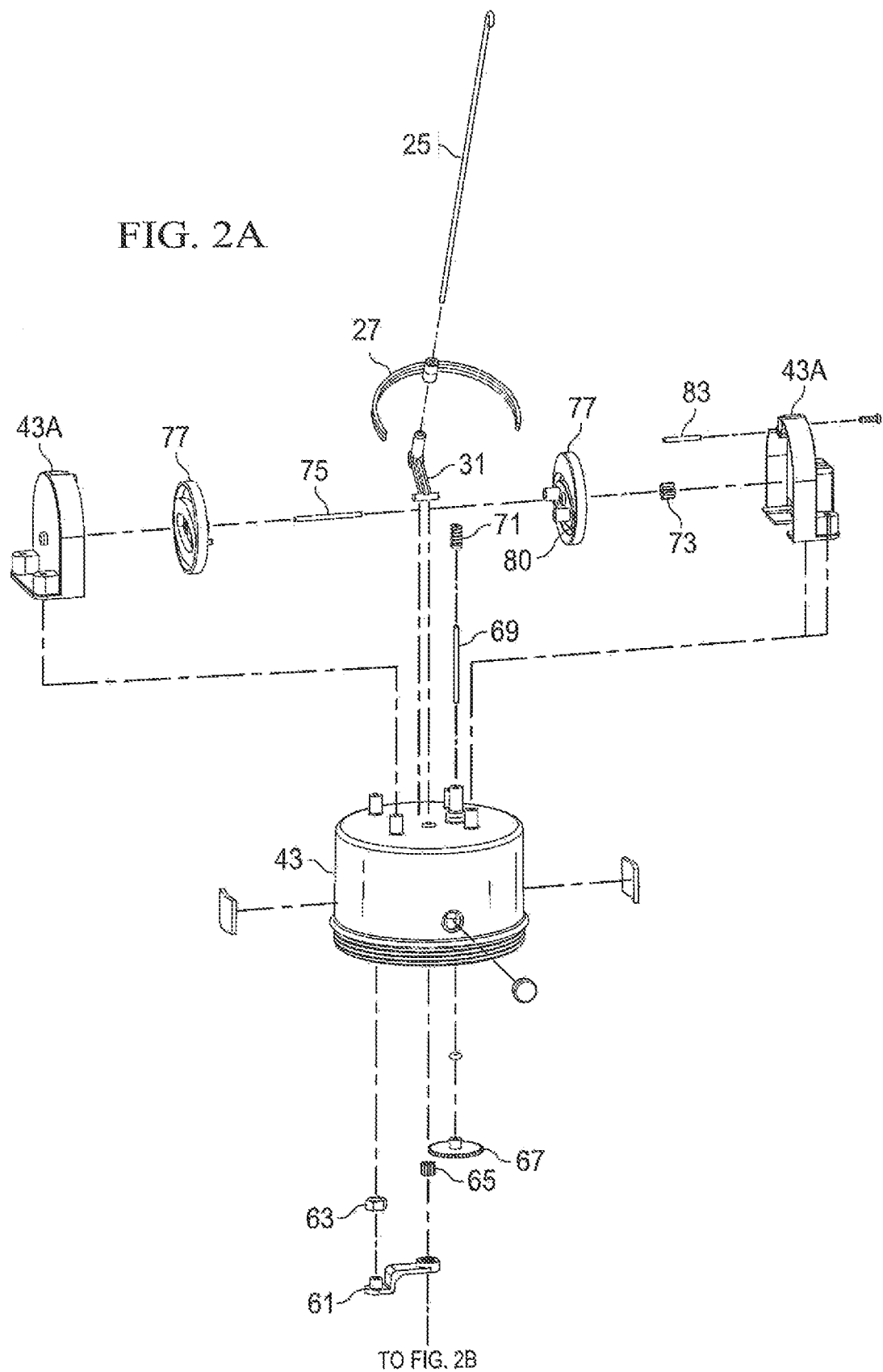
FIGS. 2A and 2B are an exploded view of the decoy apparatus.
Figure 2B:
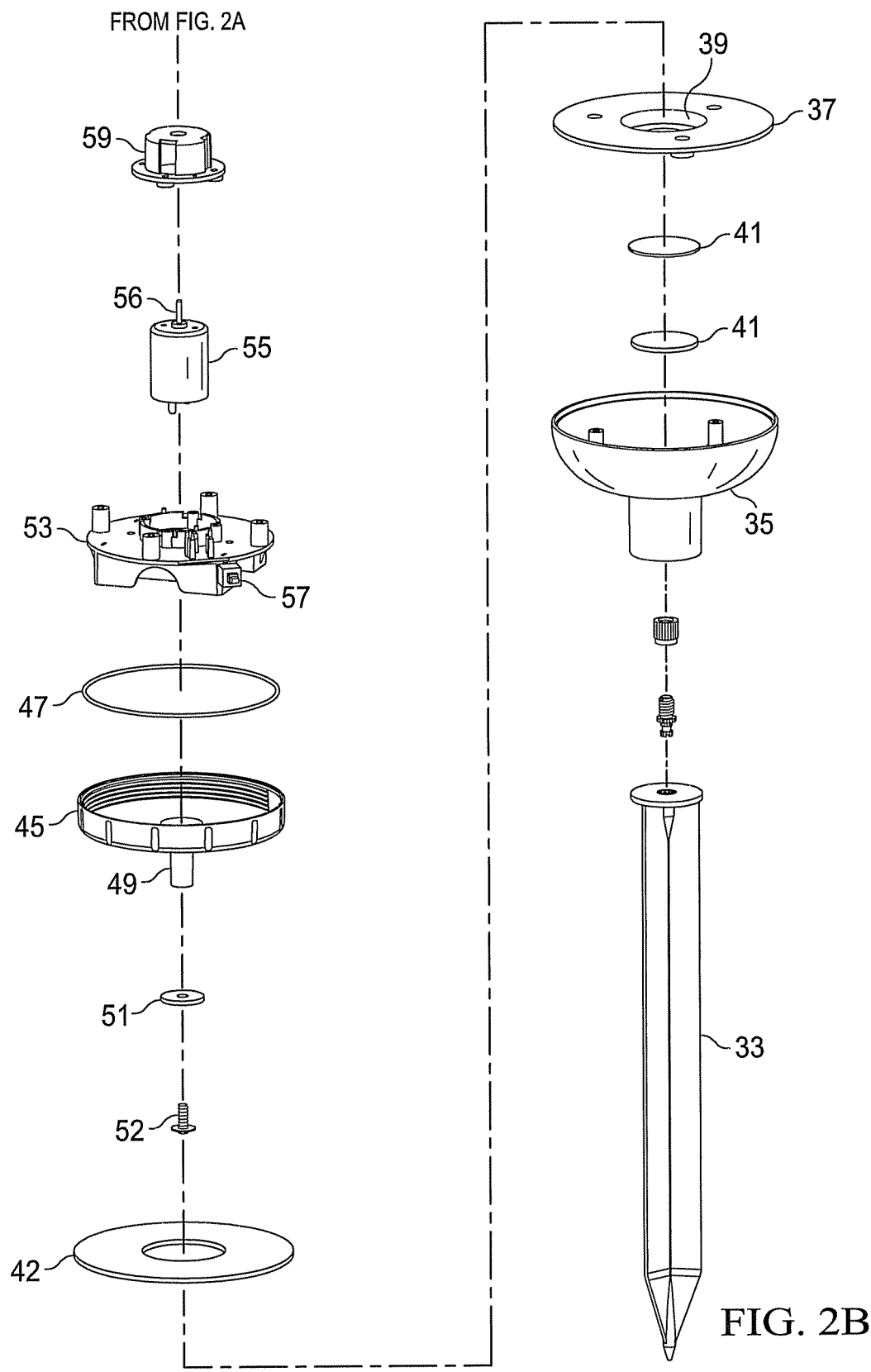
Figure 4:
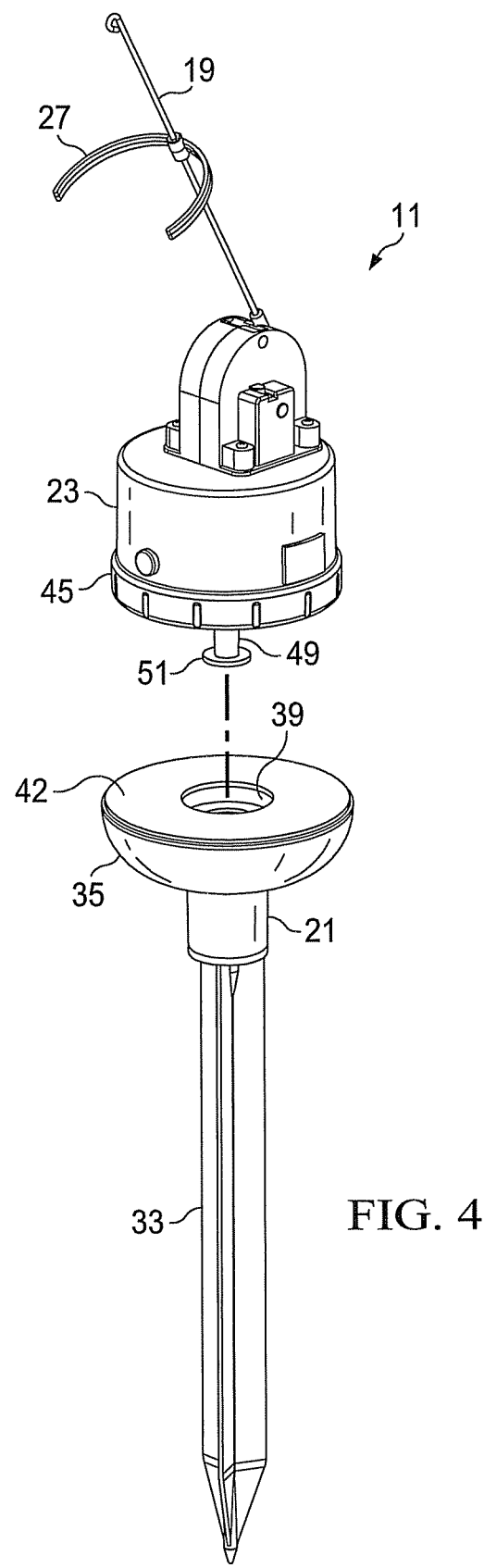
FIG. 4 is an exploded view of the motor unit and the base unit.

Referring to FIGS. 1, 2B and 4, the base unit 21 provides a stable platform for the remainder of the apparatus. For example, as shown, the base unit 21 has a stake 33 for insertion into the ground. The base unit need not have a stake, but could have other ways to anchor to the ground or to an object like a log, a stump, post, etc. The base unit has a cup shaped piece 35 that mounts to the top of the stake 33 (such as by a threaded insert and screw as shown). The inside of the cup piece 35 has a cavity. A plate 37 mounts to the top end of the cup piece 35; the plate has a central opening 39. One or more pads or cushions 41 are on the inside bottom of the cup piece, beneath the opening 39. Also, an annular pad 42 is provided on the top side of the plate 37.

Referring to FIGS. 1, 2A and 2B, the motor unit 23 has a housing 43 that is closed on top and open on the bottom. The housing bottom is closed with a threaded cap 45. An O-ring 47 provides a seal around the cap. A central stem 49 projects from the cap; the stem is coaxial with the stake 33 when the motor unit 23 is assembled onto the base 21 as shown in FIG. 4. A flange 51, such as a washer, is provided at the bottom of the stem, which flange is secured by a screw 52.

Figure 3:
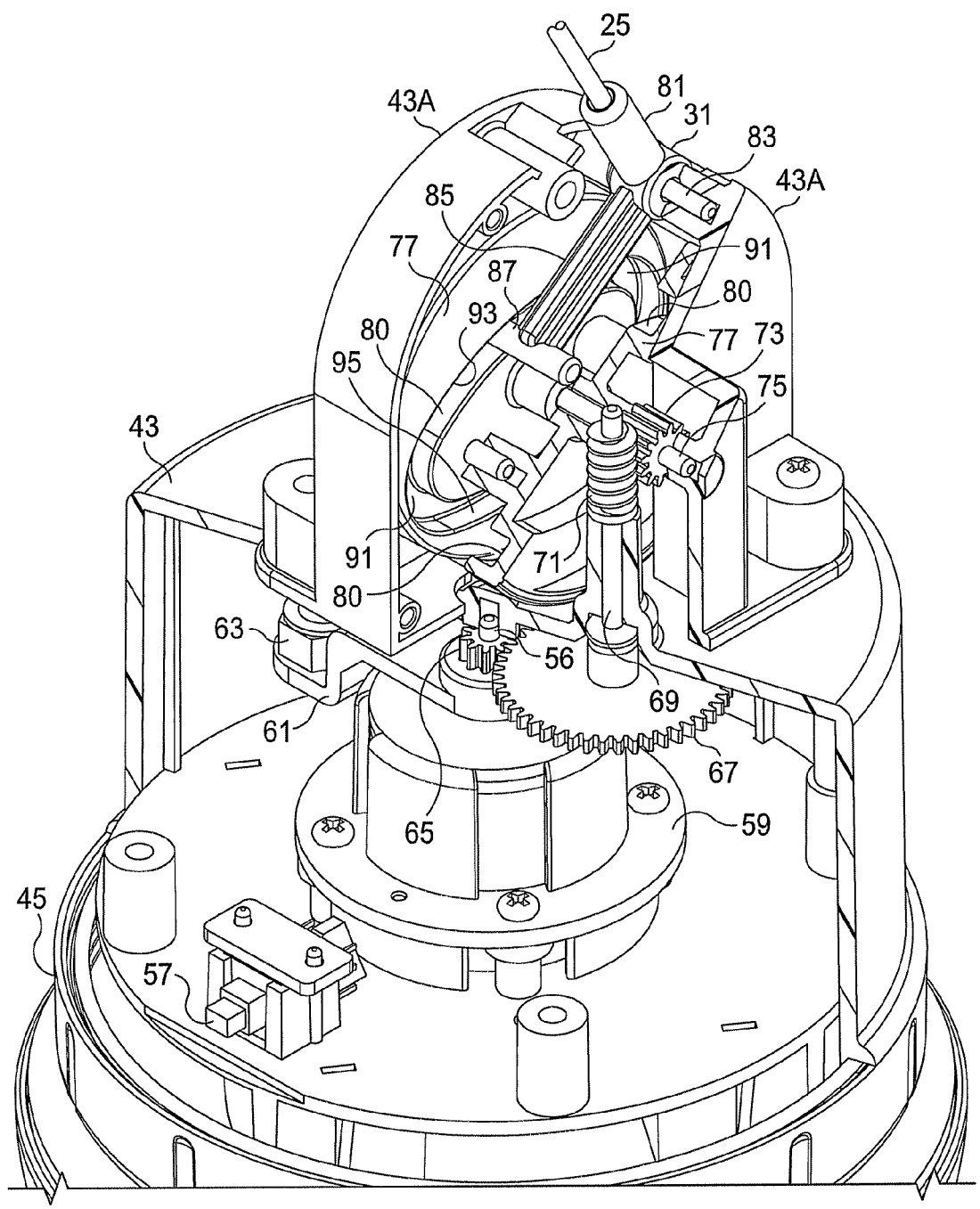
FIG. 3 is a cut-away view showing the drive mechanism of the decoy apparatus.

When the cap 45 is removed from the housing 43, a battery compartment member 53 is revealed, which contains batteries. Located above (on the top side), the battery compartment member is an electric motor 55. A switch 57 is provided to turn the motor on and off. A motor support 59 secures the motor 55 to the battery compartment member 53. Referring to FIGS. 2A, 2B and 3, the motor shaft 56 projects through the support and receives an eccentric arm 61. The eccentric arm projects radially from the motor shaft. The free end of the eccentric arm has a weight 63 or mass thereon. Located above the eccentric arm is a gear 65. The motor shaft rotates the gear 65 and the eccentric arm 61. A main driving gear 67 meshes with the gear 65. The main driving gear 67 is connected to a shaft 69 that extends through the housing 43. The top end of the shaft has a worm gear 71. The main driving gear 67 and the worm gear 71 rotate in unison. The worm gear engages a cam gear 73. The cam gear 73 rotates a shaft 75 and a cam 77. The shaft 75 is supported by a cam box 43A that is part of a housing. The cam 77 has two cam members with a gap there between. The two cam members have aligned oval shaped grooves 80 located about the shaft 75.

The support arm 25 fits into a socket 81 of the actuator 31. The actuator 31 is pivotally mounted to the cam box 43A by a shaft 83. An extension 85 connects a cam rod 87 to the socket 81. The cam rod 87 has ends that are located in the cam grooves 80.

As shown in FIG. 3, the two shafts 75, 83 are perpendicular to the motor shaft 56.

To assemble the decoy apparatus 11, the decoy cover 15 is located on the support 19 and motor unit 23. In the preferred embodiment, this involves putting the open end of the decoy cover over the support and down to the motor unit. Hook and loop fasteners are provided to secure the open end of the decoy cover to the motor unit. The stake 33 is inserted into the ground so that the opening 39 faces up. Then, as shown in FIG. 4, the stem 49 of the motor unit is inserted into the opening 39. The cap 45 is located above the pad 42 of the base unit; the motor unit typically leans over slightly so that one portion contacts the pad.

To operate, the switch 57 is closed, causing the motor 55 to spin its motor shaft 56. The motor rotates the cam 77 by way of the gears 65, 67, 71, 73. As the motor rotates the cam 77, the cam rod 87 follows the cam grooves 80. The cam rod 87 moves up and down relative to the cam shaft 75. Such up and down movement causes the actuator 31 to pivot about shaft 83 and the support arm 25 to move. The support arm 25 moves from a near vertical position to lower positions, which lower positions are at some angle to the vertical.

The cam groove 80 has two ends 91 and first and second sides 93, 95 (see FIG. 3). When the cam rod 87 is located in an end 91 of the cam grooves, the support arm 25 is at its most vertical, or upright, position 101A (shown in dashed lines in FIG. 1). As the cam rod moves into the first or second side 93, 95 of the cam grooves, the support arm moves, or dips, down to a lower position 101B, 101C.

The cam grooves 80 are designed to provide erratic motion in the support arm 25 in the decoy cover 15. The cam shaft 75 is eccentrically located with respect to the cam grooves 80, being closer to the first side 93 than to the second side 95. Thus, when the cam rod 87 moves from an end 91 to the first side 93 of the grooves, the support arm 25 moves from the first, or upright, position 101A to a second position 101C. This second position is at a first angle with respect to the upright position. However, when the cam rod moves from an end 91 to the second side 95, the support arm 25 moves from the upright position 101A to a third position 101B. The third position is at a second angle with respect to the upright position. The second angle is greater than the first angle. Thus, following the rotation of the cam grooves, the support arm moves from the first, or upright, position 101A down to the second position 101C, back up to the upright position 101A then down to the third position 101B and back up to the upright position 101A and the movement repeats. This shallow movement between positions 101A to 101C followed by a larger movement between positions 101A to 101B of the support arm enhances the erratic motion of the decoy. Erratic motion appears to be more lifelike than regular cyclic motion.

Further adding to the erratic motion is the eccentric weight 63 rocking and rotating the housing 43 and the entire motor unit 23. This eccentric weight causes the motor unit to rock back and forth on the stem 49 in the base unit 21 and to rotate with respect to the base unit. Rotation of the motor unit is slower than the motor shaft speed as the motor unit "walks" in rotation on top of the base unit. Thus, to a predator, the decoy is not only moving up and down but from side to side and spinning.

In addition, the cam shaft 75 can be eccentrically located, not only with respect to the groove first and second sides 93, 95, but also to the two ends 91. In this scenario, the first position 101A would be for one of the ends 91, while another nearby position would be the uppermost position for the other end. As used herein, the first position references both of the upright support arm positions when the cam rod is either groove end 91.

In a simpler embodiment, the motor unit could be fixed to the base unit. The motor unit eccentric arm and weight would be eliminated. The support arm 25 and decoy cover 15 could be oriented horizontally, like an animal tail.

The foregoing disclosure and showings made in the drawings are merely illustrative of the principles of this invention and are not to be interpreted in a limiting sense.

The invention claimed is:

1. An electric decoy apparatus, comprising:
   a) a housing;
   b) a motor located inside of the housing, the motor has a motor shaft;
   c) a support, arm extending from the housing, the support arm coupled to a support arm member, the support arm member pivotally coupled to the housing by a first shaft;
   d) a decoy cover located on the support arm;
   e) a cam coupled to the housing, and rotated by the motor about a second shaft, the first and second shafts separated from each other by a distance, the first and second shafts having longitudinal axes that are laterally offset from each other, the support arm member contacting the cam so as to pivot relative to the housing as the earn rotates.

2. The electric decoy apparatus of claim 1, wherein the housing is pivotally mounted to a base, the apparatus further comprising a weight eccentrically located relative to the motor shaft, the weight being separate and apart from the cam, the weight rotated by the motor shaft so as to cause the housing to move with respect to the base.

3. The electric decoy apparatus of claim 2, wherein the housing rocks and rotates with respect to the base.

4. An electric decoy apparatus, comprising:
   a) a housing;
   b) a motor located inside of the housing, the motor has a motor shaft;
   c) a support arm extending from the housing, the support arm coupled to a support arm member, the support arm member pivotally coupled to the housing by a first shaft;
   d) a decoy cover located on the support arm;
   e) a cam coupled to the housing and rotated by the motor about a second shaft, the first and second shafts separated from each other by a distance, the support arm member contacting the cam so as to pivot relative to the housing as the cam rotates, wherein the cam has a cam groove and the support arm member has a cam rod located in the earn groove, the cam rod moving in the cam groove when the cam rotates.

5. The electric decoy apparatus of claim 4, wherein the motor shaft rotates about an axis that is perpendicular to the first shaft.

6. The electric decoy apparatus of claim 4, wherein the cam groove is oval shaped.

7. The electric decoy apparatus of claim 6, wherein the second shaft is eccentrically located with respect to the oval shaped groove.

8. An electric decoy apparatus, comprising:
   a) a housing;
   b) a motor located inside of the housing, the motor has a motor shaft;
   c) a support arm extending from the housing, the support arm coupled to a support arm member, the support arm member pivotally coupled to the housing by a first shaft;
   d) a decoy cover located on the support arm;
   e) a cam coupled to the housing and rotated by the motor about a second shaft, the first and second shafts separated from each other by a distance, the support arm member contacting the cam so as to pivot relative to the housing as the cam rotates;
   f) the cam has a cam groove and the support arm member has a cam rod located, in the cam groove, the cam rod moving in the cam groove when the cam rotates;
   g) the cam groove is oval shaped;
   h) the second shaft is eccentrically located with respect to the oval shaped groove;
   i) the housing is pivotally mounted to a base, the apparatus further comprising a weight eccentrically located relative to the motor shaft, the weight rotated by the motor shaft so as to cause the housing to move with respect to the base.

* * * * *